Aug. 7, 1945.         H. E. BLACKBURN         2,381,030
               SHEET METAL SEAM OR JOINT
         Filed April 27, 1942         2 Sheets-Sheet 2
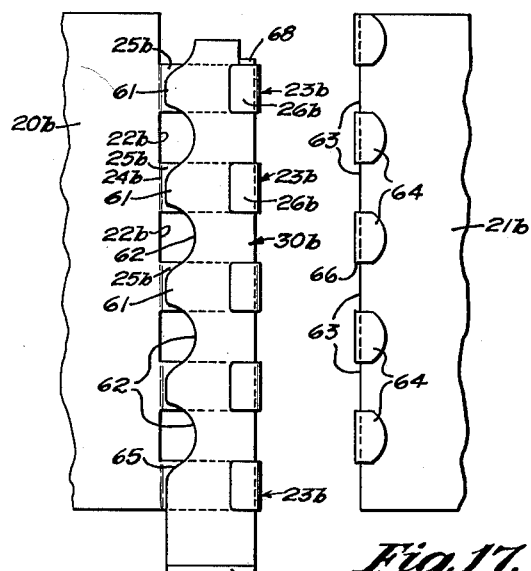
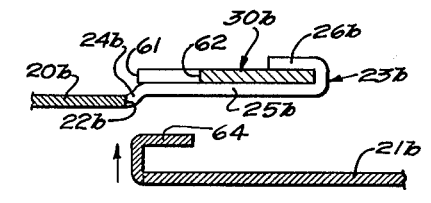
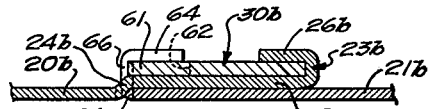
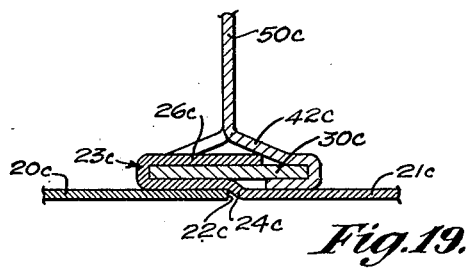
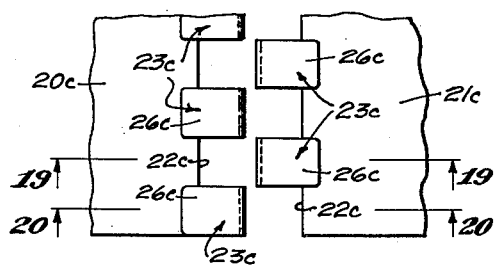
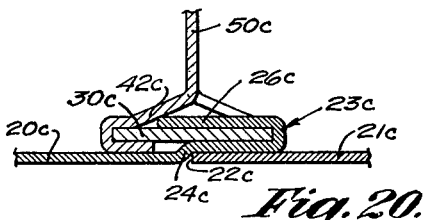
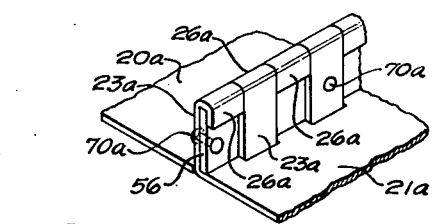
Inventor
Hubert E. Blackburn.
Attorneys.

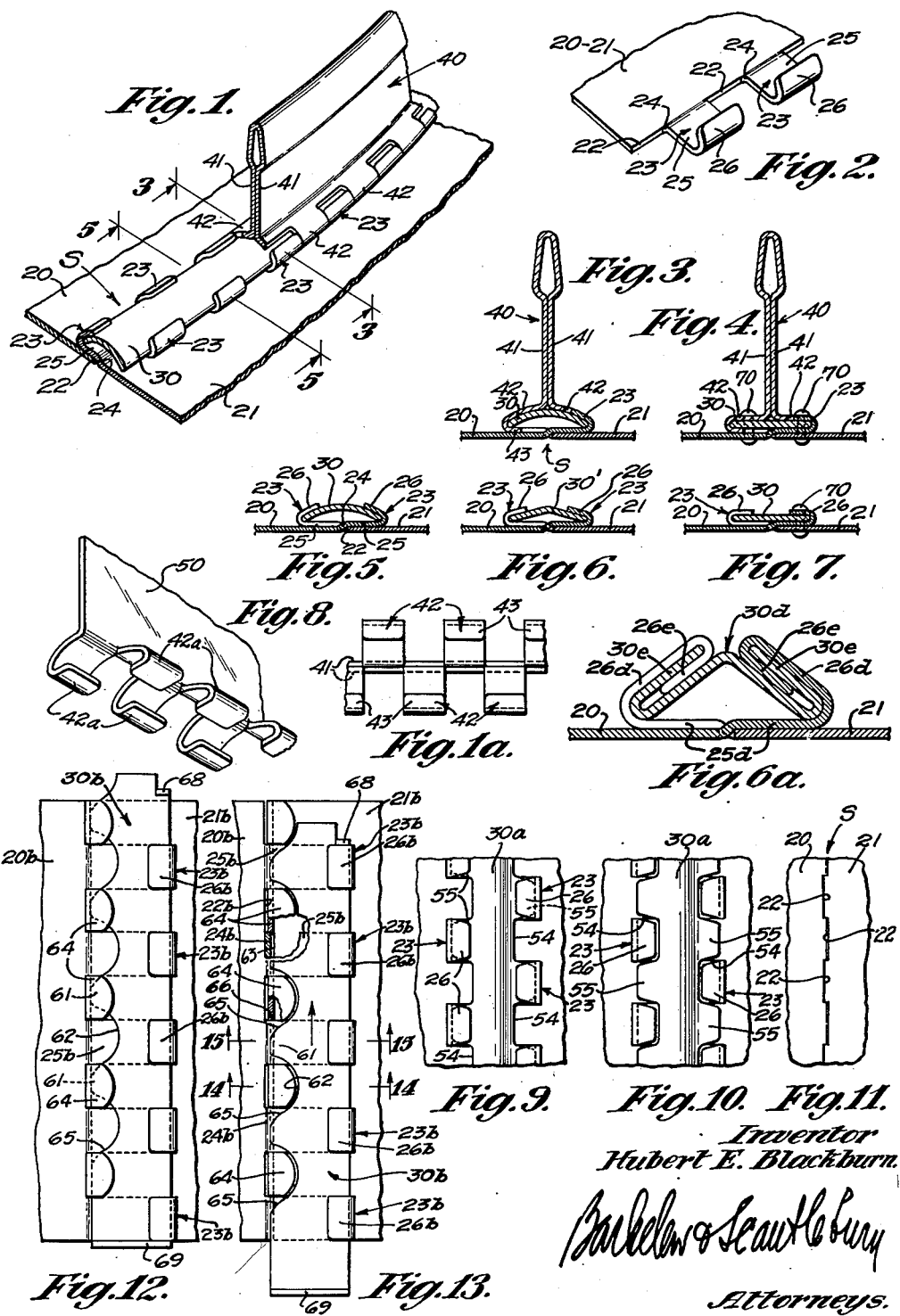

Patented Aug. 7, 1945

2,381,030

UNITED STATES PATENT OFFICE 2,381,030

SHEET METAL SEAM OR JOINT

Hubert E. Blackburn, Los Angeles, Calif.

Application April 27, 1942, Serial No. 440,679

4 Claims. (Cl. 189—36)

This invention relates generally to seams for detachably joining sheet metal or similar sections, particularly certain sections of the sheet metal sheathing on aircraft, though not limited to such use.

There are numbers of needs about modern aircraft for a simple, inexpensive, quickly detachable sheet metal seam. Such a seam is indicated wherever there is occasion to install a removable sheet metal section, so as to permit inspection or repair of covered parts. There are many curved sheets installed to cover or streamline irregular constructions in the external form of aircraft, where no great structural strength is called for, and which may be installed more rapidly and conveniently with a seam of the present type which also permits instant removal to provide access to underlying structure. And there is often need for a quickly detachable type of seam even in some instances in which a certain degree of structural strength must be provided. One obvious requirement of any such seam is that, when used in the exterior sheathing of aircraft, it should present a smooth uninterrupted exterior surface to the slip stream.

The objects of the present invention are to provide a simple, inexpensive, quickly attachable and detachable seam or joint for sheet metal and similar materials, adaptable to metal aircraft sheathing, possessing a substantial degree of structural strength, and presenting a perfectly smooth uninterrupted external surface.

The invention itself, together with various additional objects not mentioned in the foregoing, as well as its various accomplishments and advantages, will be gathered from the following detailed description of several typical illustrative embodiments, reference for this purpose being had to the accompanying drawings, in which:

Fig. 1 is a perspective showing my sheet metal seam in one of its preferred forms, and showing also the optional use therewith of a stiffening rib;

Fig. 1a is a fragmentary bottom plan view of the stiffening rib of Fig. 1;

Fig. 2 is a detailed perspective showing the edge formation of the sheets in accordance with the form of Fig. 1;

Fig. 3 is a transverse section as indicated by line 3—3 of Fig. 1;

Fig. 4 is a section similar to Fig. 3, but showing the device modified to provide a permanent fastening;

Fig. 5 is a transverse cross section taken on line 5—5 of Fig. 1;

Fig. 6 is a view similar to Fig. 5, but showing a modification;

Fig. 6a is a section similar to that of Fig. 6, showing another modification;

Fig. 7 is a view showing the forms of either Fig. 5 or Fig. 6 modified to effect a permanent fastening;

Fig. 8 is a detail perspective showing a modification of a portion of Fig. 1, in accordance with which the seam may be provided with a single walled bracing rib, or may fasten in one edge of a bulkhead;

Figs. 9 and 10 are detail plan views showing a seam similar to that of Fig. 1 but with a modified form of locking key, the key being shown in two different positions in the two figures;

Fig. 11 is a bottom plan view of the seam of Fig. 1;

Figs. 12 and 13 are plan views, of a modified form of seam, Fig. 13 showing the parts prior to locking, and Fig. 12 showing the parts locked, parts of Fig. 13 being broken away;

Fig. 14 is a cross section showing the two parts of the seam of Figs. 12 and 13 in position just before assembly, the section being taken on line 14—14 of Fig. 13;

Fig. 15 shows the same parts after assembly, but prior to locking, the section being taken on line 15—15 of Fig. 13;

Figs. 15 and 17 are plan views showing separately the two parts of said modified form of seam;

Fig. 18 is a plan view of two parts of a modified seam;

Fig. 19 is a section on line 19—19 of Fig. 18, with the edge of a stiffening wall or bulk-head incorporated in the seam;

Fig. 20 is a view similar to Fig. 19, but taken on line 20—20 of Fig. 18; and

Fig. 21 is a detailed perspective of another modification of the invention.

With reference first to the form of the device shown in Figs. 1, 2, 5 and 11, numerals 20 and 21 designate generally portions of two abutting sections or sheets of sheet metal, joined and fastened along their meeting edges by means of my improved seam S. The two sheets 20 and 21 are formed with straight edges 22, from each of which projects a plurality of spaced hook tabs 23, the spacing being such that the hook tabs on each sheet will receive nicely or comparatively closely between them the corresponding hook tabs on the adjoining sheet when the edges of the two sheets are brought together. And preferably, in this form of the invention, the hook tabs and their spacing are identical for the two sheets; that is to say, the edges of the two sheets are provided with identical tab formations. In the particular form of Figs. 1, 2 and 5, the tabs are bent upwardly from the meeting edges 22, as at 24 (Fig. 5), and then extend straight forwardly, in parallelism with the sheet, as at 25, the offset at 24 being substantially equal to the thickness of the sheet. The extremities of the tabs are formed with reversely bent hook portions 26. The two sheets 20 and 21 are joined with the tabs of each sheet received in the spaces between the tabs of the other, and the offset portions or shoulders 24 at the bases of the tabs of each sheet are abutted by the straight edge 22 of the other sheet. As will be seen in Fig. 5, the undersides of the projecting portions 25 of the tabs of each sheet lie flat against the upper surface of the other sheet, and the underside of the two joined sheets 20 and 21 presents a smooth continuous surface.

I have said that the offset at the shoulders 24 is an offset equal to the thickness of the sheet. More generally speaking, that offset of the tabs of each sheet is equal to the thickness of the other sheet, if it is desired to form a joint or seam with a flush external face. Under that condition, if the sheets are of equal thickness, then the offset is equal to the thickness of both sheets. Throughout these descriptions I assume both of the stated conditions, for purposes of clarity and ease of description; but I do not limit my invention thereto.

To lock the sheets together, a locking member or key in the form of a long strap 30 is slid longitudinally into position under the hook portions 26 of the tabs on the two sheets. The tabs 23 of the two sheets define a guideway of somewhat elongated cross-section for the locking element 30, which is readily slid into position by inserting it from the end of such guideway and forcing it ahead under the hook portions 26 of the successive tabs. In the form of Figs. 1 and 5, this locking member 30 is formed with a transverse bend, being shown as of arcuate cross section, with its concave side facing downwardly. In the modification of Fig. 6, the locking member 30' is of angle section, as shown. In Fig. 7, the locking member is perfectly flat. In all cases, the hook portions 26 of the tabs are shaped to conform to the cross-section of the locking member, so as to afford a sufficient area of frictional contact between the locking member and the tabs so that the locking members will be securely bound in position. The fit is preferably made such, however, that the locking member may be inserted or withdrawn without difficulty. It will also be noted that the cross-sectional shapes of the guideway and of the key are in all cases non-circular, so that hinge action is prevented.

The locking member 30 being thus placed, the two sheets 20 and 21 cannot be separated, and cannot be bent relatively to one another by hinge action. Thus, viewing the seam in the aspect of Fig. 5, the two sheets 20 and 21 cannot be bent upwardly towards one another because of the engagement of the undersides of the portions 25 of the tabs of each sheet with the upper face of the other sheet; and they cannot be bent downwardly toward one another, since to do so, the hook portions of the tabs on the respective sheets would have to move toward one another, which they are prevented from doing by reason of their engagement with the edges of the interposed locking member 30. The locking member 30 also holds the edge portions 22 of each sheet tightly against the shoulders 24 on the bases of the tabs of the other sheet, and the snug fit of locking member 30 within the hook portions 26 of the tabs removes all looseness or play and affords a comparatively firm or rigid joint.

The sheets 20 and 21 may either be flat, or they may be curved, in which instance the locking member 30 is simply curved correspondingly. Fig. 1 indicates the application of the seam to two sheets 20 and 21 having some curvature, the locking member 30 being indicated as formed with a longitudinal curvature corresponding to the curvature of the plane of the joined sheets. I have described the meeting edges of the sheets as being straight, when viewed in plan. That, however, is not necessary as long as the edge curvature, and the corresponding curvatures of the ways and of the locking key are such that the key can be inserted. And any difficulty in that regard largely disappears in the modified form of key shown in Figs. 9 and 10 and explained afterwards.

If it should be desired to make the seam permanent, after insertion of the locking member, the locking member and the over-hanging hook portions of the tabs may be flattened and spread by the application of pressure. Thus assuming a locking member originally either of arcuate or angular cross section (Fig. 5 or Fig. 6), such locking member, after insertion, may be flattened and spread somewhat in width, so as to assume the form shown in Fig. 7, thereby causing it to become frictionally bound more tightly within the hook members, which are also bent down flat against it to further increase the frictional hold. The seam is thus permanently locked, and the locking member cannot be displaced except by the application of considerable driving force.

Numeral 40 in Fig. 1 designates a bracing rib, which may be used with the seam where desirable. This bracing rib, in the form shown in Figs. 1 and 1a, comprises a doubled strip of metal, each of the two walls 41 of which has a plurality of spaced hooks 42 adapted to fit in between the tabs 23 of the seam, the hooks 42 formed on one wall 41 alternating with the hooks 42 on the other, as best illustrated in Fig. 1a. The undersides of the inwardly bent extremities 43 of the hooks 42 engage the upper surface of the joined sheets 20 and 21, and the hooks 42 are shaped to conform to the locking-member guideway already defined by the hook-shaped tabs 23, as will be evident from an inspection of Figs. 1 and 3. It will be understood that the bracing rib 40, when used, will be arranged with its hook members 42 interfitted with the tabs 23 of the two sheets 20 and 21 prior to insertion of the locking member 30, and that when the locking member 30 is then inserted, it will interlock the tabs 23 of the two sheets 20 and 21 and the hook members 42 of the bracing rib. The undersides of the extremities 43 of the bracing rib hooks are held by the locking member in firm engagement with the upper surfaces of the sheets 20 and 21, and the whole assembly forms a rigidly interconnected structure, with the bracing rib lending support to the seam and to the wall made up of the joined sheets 20 and 21. The bracing rib may be a mere rib, or may be part of a wall or panel or the like.

Fig. 4 shows the locking key, the hook tabs, and the hook members 42 of the bracing rib in a flat form. It will be understood that these parts may originally have the shape illustrated, or may originally have the shape of Fig. 3, and be subsequently flattened by application of pressure to effect a permanently connected seam.

Fig. 8 shows a modified form of bracing member or wall which may be substituted for the rib 40 shown in Fig. 1. In this instance, the double walled rib of Fig. 1 is substituted for by a single wall 50 which is formed along its edge with oppositely bent hook members 42a, which will be understood to be similar to the hook members 42 of Fig. 1 and to have the same function. Obviously, the wall 50 of Fig. 8 may be employed as a bracing rib, or alternatively, as a partition or bulk-head, which will be understood as installed in connection with the seam the same as the bracing rib 40 described immediately above.

Figs. 9 and 10 show a seam of the same type as that disclosed in Figs. 1, 2 and 5, with the sole exception that a modified locking member is employed. The locking member, designated by numeral 30a, is in this instance formed along its two opposite edges with staggered notches 54 of sufficient size to pass the tabs 23, which are the same as in the form of Fig. 1. The notching of the edges of the locking member forms locking lugs 55, and, as best seen in Fig. 10, the locking lugs 55 on each edge of the locking member come opposite the notches 54 on the other. The locking member 30a is inserted by registering its said notches 54 with the tabs 23 and then pressing it inwardly (downwardly in Fig. 1) into place within the guideway defined by the tabs (see Fig. 10). The locking member is then moved longitudinally only far enough to engage the lugs 55 under the hook portions 26 of the tabs, as in Fig. 9. The form of Figs. 9 and 10 thus has the advantage that the locking member need not be inserted from the end, which might sometimes be impossible owing to lack of necessary clearance. On the contrary, the locking member 30a need simply be laid against the seam, with its notches 54 in proper register, pressed inwardly into the guideway, and then shifted a short distance longitudinally to engage its lugs 55 with the hook portions of the tabs.

Fig. 6a shows another modification which may be applied in any of the forms like those of Figs. 1 to 11. In this figure the locking key 30d is shown as generally angular in its cross-sectional shape, but it differs from the keys of the other figures by having two return-bent flanges or hook portions 30e at its outer edges. These hook portions 30e engage with interfitting hook portions 26e which are formed on the ends of the tab-hooks 26d, which latter, and tabs 25d, are similar to the hooks 26 and tabs 25 previously described. The structure of Fig. 6a thus has all the functions of the forms previously explained, and in addition the hook formation of the locking key gives that key a tying function between the two tab-hooks 26d. In the previously explained forms, the key 30 has a spreading function between the two sets of tab-hooks; in the form of Fig. 6a the key 30d has that spreading function and, additionally, a tying function between the two sets of tab-hooks. That additional action strengthens the joint between the two plates correspondingly. The modification shown in Fig. 6a may be applied to a key of any of the cross-sectional shapes shown in the other figures, and may also be flattened down, as explained in connection with Fig. 7.

Fig. 21 illustrates a further modification, in which two sheets 20a and 21a are each formed with spaced vertically bent tabs 23a, formed at the top with downwardly bent hook portions 26a, said tabs, when interfitted, defining a way in a vertical plane for a locking element in the form of a vertically disposed flat strap or key 56. It will be evident that this locking element 56 when slid into position, bears alternately on the vertically disposed faces of the tabs extending from the two sheets, and secures the joint firmly against separation, as well as against hinge action in either direction.

Figs. 12 to 17 show a still further modification, in which two sheets or sheet members 20b and 21b to be joined are interfitted by movement at right angles to their planes, rather than by lateral movement in their planes, as with the first described forms. The sheet 20b is formed with hook tabs 23b, which are generally similar to the hook tabs 23 of the form of Fig. 1 in that they are formed at their bases with upward offsets 24b, the offset distance being equal to the thickness of the other sheet, and, forwardly of said offsets, with portions 25b parallel to and resting on the upper face of the other sheet, and finally, with reversely bent hook portions 26b. Between the tabs 23b sheet 20b has straight edge portions 22b.

The other sheet 21b is formed along its edge 63 with upwardly and rearwardly bent hook tabs 64, spaced so as to be receivable within the spaces intervening between the hook tabs 23b of the sheet 20b. Although, as will presently become evident, the locking key for this form of the invention may be in the form of a flat strap with straight edges, I have here illustrated a locking key 30b in the form of a strap having one edge provided with alternate locking lugs 61 and notches 62, the spacing of the lugs 61 being equal to the spacing of the tabs 23b. This key is slidably received and supported by the hook tabs 23b, the straight edge of the key engaging the hook ends of the tabs, all as will be evident from Figs. 12, 13 and 14. The locking key 30b being in the longitudinal position illustrated in Fig. 16, the notches 62 thereof register with the spaces between hook tabs 23b, providing openings defined by the notches 62, the edges 22b, and the edges of the tabs 23b. The sheet 21b is then placed below the sheet 20b, with the hook tabs 64 of the former in register with those openings (Fig. 14), and the two sheets are then moved together, into the same plane, the tabs 64 passing through said openings, and the parts then being in the position of Fig. 15. The hook tabs 64 extend upwardly above the sheet 21b a distance just sufficient to permit reception of the lugs 61 of locking member 30b under them (see Fig. 15). To lock the two sheets together, the locking member 30b is moved from the position of Fig. 13 to the position of Fig. 12, the lugs 61 moving under and engaging the undersides of the hook tabs 64. The two sheets 20b and 21b are then locked together in substantially the same manner as the sheets 20 and 21 of Fig. 1. Preferably, the locking lugs 61 are formed with smooth cam surfaces 65 adapted for engagement with the edge portions 66 of the hook tabs 64. As the locking member 30b is moved in the direction indicated by the arrow in Fig. 13, this cam surface 65 engages the edge 66 and moves it toward the left, as viewed in the figure, thus drawing the two sheets 20b and 21b tightly together. Movement of the locking member into locking position thus serves also to draw the two edges of the sheet together in the event that they should originally be slightly separated. If desired, stop means may be provided for limiting the movement of the locking member 30b to the range determined by the two extreme positions shown in Figs. 12 and 13. For this purpose, the upper end of the locking member, as seen in the figures, may be formed with an upwardly turned stop lug 68 engageable with the upper hook tab 23b when in the position of Fig. 13, and the lower end of the locking member is formed with an up-turned end portion 69 engageable with the lower hook tab 23b when in the position of Fig. 12.

It will be entirely obvious that the notching of the one edge of the key 30b of the form of Figs. 12–17 is not essential if the key be inserted from one end of the seam after the tabs of the two sheets are interfitted.

Figs. 18–20 illustrate a modified form of seam of the type incorporating an edge of a bulkhead or stiffening wall. Fig. 18 shows the two sheets 20c and 21c formed with tabs 23c, in general, of the same type as those of Fig. 1, but whose hook portions 26c are lengthened to extend back somewhat inside the edges of the respective sheets. The hook formations are also flattened, as in Fig. 7. The bulk-head or stiffening member 50c is in general of the type shown in Fig. 8, though here shown with hook formations 42c of somewhat modified cross-section. Figs. 19 and 20 show how the ends of the hook tabs 26c engage under the hook portions 42c of the member 50c, contributing added stiffness and strength to the structure.

Any of the forms of my seam or joint may be finally secured by riveting, welding, brazing, or similar known means. For instance, after the joint has been assembled and the key inserted, a rivet or rivets may be set through the key and through other parts of the joint. Whatever the shape of the hook-tabs may be, a rivet may be set through one or more of them and through the key. Figs. 4 and 7 show illustrative applications of rivets at 70, applied to the keys and hook-tabs and also to the tabs 42 of the panel 41. And in joint designs where the hook tabs extend up at opposite side faces of a key (as for instance in Fig. 21) the rivets may be applied through the tabs and key as indicated at 70a in that figure.

Further, as will well be understood without specific illustration, the joint may be finally secured by welding, brazing, etc. applied to any of the relatively movable parts, as the keys and tabs, or applied to the seam line along the sheet edges 22. Welding, brazing etc. applied along that line will not only permanently secure the sheets together but may also smooth out the slight surface irregularities, which extend along the joint line, and thus fully stream line the surface at the joint.

In any situation where the joint or joints are finally permanently secured in any manner, my joint provides a facile means of initially assembling and setting up the parts.

Several forms of my invention have now been disclosed by way of illustration of some of its various possibilities. It will be evident that the improved sheet metal seam provided by the invention, as exemplified in these embodiments, is characterized by inexpensiveness, simplicity, substantial strength and rigidity, capability of instant connection and disconnection, and finally, presentation of a substantially unbroken exterior surface where the edges of the two sheets are brought together.

It will of course be understood that various changes in design, structure and arrangement may be made without departing from the spirit and scope of the invention or of the appended claims.

I claim:

1. In a seam for joining the abutting edges of two sheets of metal, the combination of a plurality of spaced hook tabs formed on each of said abutting edges, the hook tabs of each of the sheets being receivable in the spaces between the hook tabs of the other, said hook tabs having hook portions defining a guideway longitudinally of the seam for a locking element when the said edges of the sheet are moved substantially into abutting relationship, and having reentrant hook portions on the ends of said hook portions and a locking key movable longitudinally but non-rotatably in said guideway, and formed with hook portions engageable with said reentrant hook portions, whereby the key acts to tie the hook tabs of the two sheets together as well as to hold the tabs spaced apart, said key and hook tabs having engaging surfaces preventing relative rotation of said key in said guideway.

2. In a seam for joining the abutting edges of two sheets of metal, the combination of a plurality of spaced hook tabs formed on each of said abutting edges, the hook tabs of each of the sheets being receivable in the spaces between the hook tabs of the other sheet, the hook tabs of each sheet having an offset substantially equal to the thickness of the other sheet at their point of juncture with the abutting edge of the sheet, which offset forms a shoulder engageable by the abutting edge of the other sheet, the hook tabs having portions extending from said offset in a direction parallel to the sheet, in a manner to be engageable with the opposing face of the other sheet, and the tabs terminating in reversely bent hook portions adapted and shaped to define, in cooperation with the hook portions of the tabs on the other sheet, a guideway of elongate cross-sectional form for a locking key, and a locking key embodying a transversely bent strap non-rotatably engageable but longitudinally slidable in said guideway, said transversely bent strap being adapted to be somewhat flattened and spread subsequent to insertion in said guideway, whereby the said shoulders on each sheet are drawn tightly against the abutting edges on the other.

3. In a seam for joining the abutting edges of two sheets of metal, the combination of a plurality of spaced hook tabs formed on each of said abutting edges, the hook tabs of each of the sheets being receivable in the spaces between the hook tabs of the other sheet, the hook tabs of at least one of the sheets having an offset, substantially equal to the thickness of the other sheet, at their point of juncture with the abutting edge of the sheet, which offset forms shoulders engageable by the abutting edge of the other sheet, the offset hook tabs having portions extending from said offset in a direction parallel to the sheet, in a manner to be engageable with the opposing face of the other sheet, and the tabs terminating in reversely bent hook portions adapted, in cooperation with the hook portions of the tabs on the other sheet, to define a guideway longitudinally of the seam for a locking element when the said edges of the sheet are moved substantially into abutting relationship, and a locking key embodying a transversely bent strap movable longitudinally but non-rotatably in said guideway, said key and hook tabs having engaging surfaces preventing relative rotation of said key in said guideway, said transversely bent strap being adapted to be somewhat flattened and spread subsequent to insertion in said guideway, whereby said shoulders on the one sheet are drawn tightly against the abutting edges on the other.

4. In a seam for joining the abutting edges of two sheets of metal, the combination of a plurality of spaced hook tabs formed on each of said abutting edges, the hook tabs of each of the sheets being receivable in the spaces between the hook tabs of the other, said hook tabs having hook portions defining a guideway longitudinally of the seam for a locking element when the said edges of the sheet are moved substantially into abutting relationship, and a locking key movable longitudinally but nonrotatably in said guideway, said key being formed along its two longitudinal edges with reversely bent hook portions, and said hook tabs having extensions engaging under said reversely bent hook portions, all in such manner that the key acts to tie the hook tabs together as well as to hold the tabs spaced apart.

HUBERT E. BLACKBURN.